United States Patent [19]

Noone

[11] 4,109,706
[45] Aug. 29, 1978

[54] THERMALLY CONDUCTIVE CERAMIC ATTACHMENT

[75] Inventor: Michael J. Noone, Wayne, Pa.

[73] Assignee: General Electric Company, Fairfield, Conn.

[21] Appl. No.: 776,271

[22] Filed: Mar. 10, 1977

[51] Int. Cl.² .................. G05D 23/00; F28F 13/18; F28F 21/00
[52] U.S. Cl. ...................... 165/32; 165/79; 165/133; 165/185; 165/DIG. 7; 310/11
[58] Field of Search ........... 165/32, 76, 79, 80, 165/133, 185, DIG. 7; 174/16 HS; 310/11

[56] References Cited

U.S. PATENT DOCUMENTS

| | | | |
|---|---|---|---|
| 789,530 | 5/1905 | Fenn et al. | 165/79 |
| 2,363,375 | 11/1944 | Wild | 165/32 |
| 2,512,143 | 6/1950 | Dailey | 165/133 |
| 3,893,161 | 7/1975 | Pesak, Jr. | 165/185 |

FOREIGN PATENT DOCUMENTS

| | | | |
|---|---|---|---|
| 518,614 | 7/1976 | U.S.S.R. | 165/32 |

*Primary Examiner*—Charles J. Myhre
*Assistant Examiner*—Sheldon Richter
*Attorney, Agent, or Firm*—Allen F. Amgott; Raymond H. Quist

[57] ABSTRACT

Copper backings brazed to ceramic parts exposed to high-temperature oxidizing high-velocity gases must be secured, for mounting purposes, to water-cooled fixed support, with high thermal conductance between backing and support. Prior art practice of brazing backing to support is inconvenient, making subsequent removal difficult, and disadvantageous in requiring that support be heated to brazing temperature (which may weaken support by annealing it). Invention teaches channel-shaped clip, on back of backing, whose legs are spread slightly to be inserted in mating slots in support face. All mating surfaces are tinned with lead-tin eutectic solder. If mere mechanical contact provides adequate thermal conductance between backing and support, solder remains unmelted; but if mechanical contact is imperfect temperature of backing will rise, and solder will melt and bridge gap between backing and support, raising thermal conductance.

4 Claims, 4 Drawing Figures

U.S. Patent  Aug. 29, 1978  4,109,706
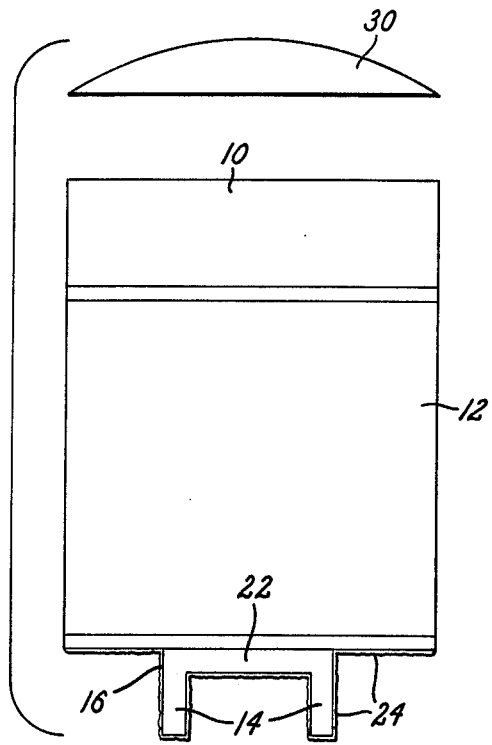
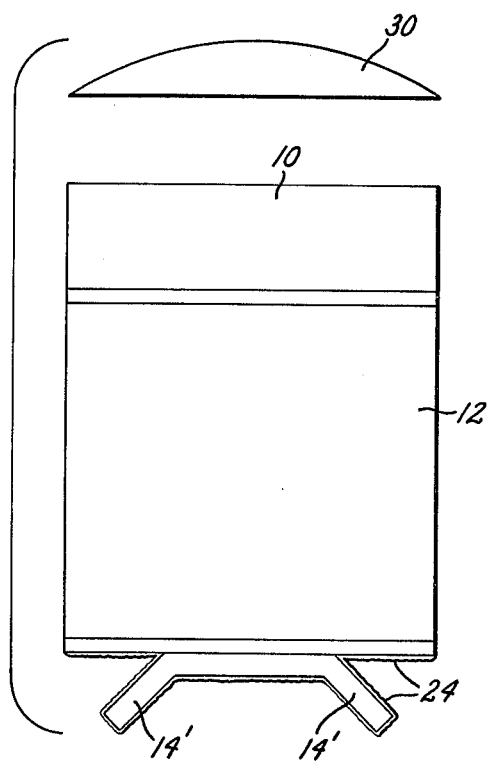
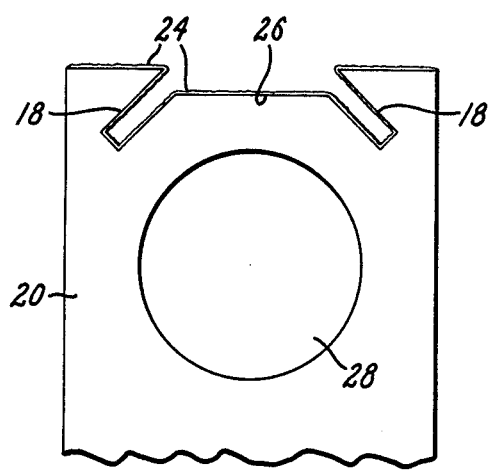
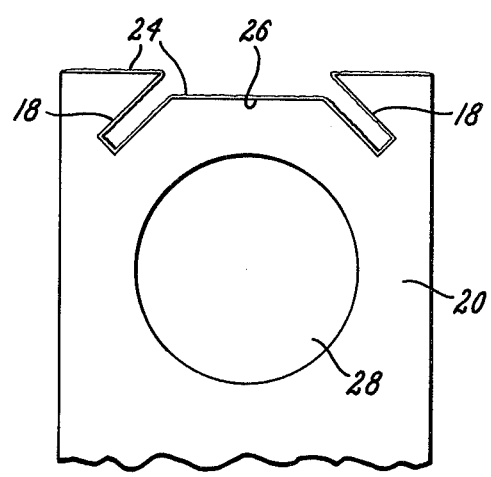

THERMALLY CONDUCTIVE CERAMIC ATTACHMENT

BACKGROUND OF THE INVENTION

1. Field of the Invention

This invention pertains to magnetohydrodynamic electric generators employing hot ionized gases as the working substance, and more particularly to apparatus therefor.

2. Summary of the Prior Art

Current practice known to the applicant has involved brazing the metal backing of the ceramic to the cooled support. Ceramic cements are old for fastening pieces exposed to high temperatures; but they generally have lower thermal conductivity than metals and hence are not suitable where high heat fluxes must be transmitted to a coolant in order to control the temperature of an exposed ceramic face, as in magnetohydrodynamic generators. Ordinary metal-to-metal joints mechanically retained must be in good mechanical alignment to retain high thermal conductance, and have clean faces; oxidation or thermal distortion will negate such a condition originally existent.

SUMMARY OF THE INVENTION

The ceramic (or other material) piece which is to be exposed to high temperatures, usually exceeding the melting temperature of the piece, is provided with a metal backing which is brazed to the piece both for mechanical connection and to provide high thermal conductance in order that the piece may be cooled below its melting point. This backing is provided with a channel whose legs extend out from the piece, and may be sprung or bent to fit into divergent or convergent slots in the cooled support to which the backing is to be affixed. Installation of the legs may be effected by forcing them into the slots from the front, or by sliding them into the slots from an edge of the support where the ends of the slots are exposed. The advantage of springing or bending the legs somewhat is that they are forced against the slot walls and are drawn (together with the rear face of the backing) toward the support; this will improve the contact of the legs with the slot walls, and of the rear face of the backing with the face of the support. All exposed contacting surfaces of the backing and of the support (including the insides of the slots and the channel legs) are tinned with a suitable low-melting metal—most conveniently the well known lead-tin eutectic. In general the surface contact mechanically produced may be adequate to transmit the heat flux through them without causing the contacting faces to reach the melting point of the lead-tin alloy. If this situation obtains, the piece with its brazed backing may be removed from the support by pulling with sufficient force to overcome the retention by the bent legs, or by sliding the legs along the slots and out of the support at an open end. But if a casual misalignment of faces intended to be in contact produces an unintended low thermal conductance, the temperature of the backing, including the channel legs, may rise above the melting point of the lead-tin alloy. In this case, the molten alloy will fill the space between the misaligned faces and increase the thermal conductance to very nearly its intended value. In this case, the alloy will probably cool down below its melting point and solidify. Removal of the piece with its backing will necessitate heating the backing and the support slightly above the melting point of the alloy; but this will still be well below the softening point of a brazing material. Similarly, if the heat flux is for any reason so great that the interface temperature rises above the alloy melting point, the molten alloy will still remain in the interface, by surface tension, and provide a highly conductive heat path.

In practice, copper is commonly used for the cooled support because of its high conductivity. Channels of copper, of nickel, and of nickel alloys have been found satisfactory. The lead-tin eutectic, because of its ready availability as commercial soft solder, and its convenient melting point (about 170° C.) has been preferred, since it wets readily the metals used. Any other alloy of suitable melting point and wetting properties might be substituted, provided that it did not contain any constituents likely to distill off at the melting point.

The use for which this invention was initially intended was the support of electrodes, insulators, and simple channel refractories for use in magneto-hydrodynamic generators employing hot ionized gas as the working fluid. While ceramic electrodes electrically conductive at their working temperature appear to be currently preferred in such applications, the piece described in the foregoing may be of suitable metal, if desired. All the means described as providing high thermal conductance will also provide good electrical conductance.

More generally, the environment for which this invention is intended is one in which there is a heat flux from a primary heat source above the permissible operating temperature of the cooled structure comprising the support and the backing which is in high thermal conductance with it. (In the typical magnetohydrodynamic generator, the piece affixed to the backing is unable to operate at the temperature of the hot gas, which is the primary source of heat flux.) This environment creates the situation that if the thermal conductance between the backing and the cooled structure is or becomes too low, the backing temperature will rise above permissible limits; as a consequence, the thermal flux through the piece and its support will decrease impermissibly, and the temperature even of the piece exposed to the primary heat source may rise beyond tolerable limits—such as the fusion temperature of the piece.

It is thus evident that for a given temperature of the primary heat source the cooling must provide such a heat flux through the structure comprising the piece and its backing that the hot end (the exposed face of the piece) is kept within permissible limits. But this heat flux is determined in large part by the temperature of the cold end (the backing face which is in thermal contact with the cooled support). The maximum permissible temperature of the cold end of this structure is thus the maximum temperature which will still produce an adequate temperature drop from hot end to cold end to produce the necessary heat flux to keep the hot end temperature at an allowable value. The fusible alloy which has been exemplified by the lead-in eutectic is thus more generally required to have a fusion point below the maximum permissible temperature of the cold end. The maximum cold-end temperature here defined may, of course, be well below the temperature which would cause any damage to the cold end material; it is the maximum temperature which will protect the hot end from injury.

BRIEF DESCRIPTION OF THE DRAWINGS

FIGS. 1 and 2 represent in elevation mating parts of a first embodiment of the invention.

FIGS. 3 and 4 represent in elevation the mating parts of a second embodiment of the invention.

DESCRIPTION OF THE PREFERRED EMBODIMENTS

FIG. 1 represents in elevation a male assembly for attaching a ceramic 10 and the backing 12 to which it is brazed by insertion of the legs 14 of channel 16 into mating slots 18 of support 20 of FIG. 2. In a typical assembly ceramic 10 was 0.10 inches (2.5 mm.) thick and 0.375 inches (9.4 mm.) wide, the width of backing 12 being the same. Backing 12 was as thick as it was wide. Channel 16 was of stock 0.020 inches thick (0.5 mm.) and its legs extended 0.065 inches (1.6 mm.) from backing 12—that is, 0.045 inches (1.1 mm.) beyond the web 22 of channel 16. The ceramic 10 was of the spinel type; backing 12 was of nickel, and channel 16 was of copper. These three pieces were brazed together. The exposed lower face of backing 12 and the exposed parts of channel 16 were tinned, after the brazing operation, with lead-tin eutectic 24—the traditional soft solder of old art. Support 20 of FIG. 2 was of copper, provided with two slots 18 0.025 inches (0.63 mm.) wide, at 45° with the upper face of support 20. The portion 26 of the upper face which lay between the convergent slots 18 was depressed 0.025 inches (0.63 mm.) below the remainder of the upper face of support 20 to accommodate the web 22 of channel 16 when legs 14 were forced into slots 18 and backing 12 was brought into contact with support 20. Support 20 was 0.375 inches (9.5 mm.) wide and provided with a water cooling passage 28. Its upper face 26, slots 18, and depressed face 26 were also tinned with lead-tin eutectic 24.

FIGS. 3 and 4 are cognates of FIGS. 1 and 2, respectively, with the exception that channel legs 14' are primed to indicate that they differ from 14 of FIG. 1 in being already bent at 45° to match slots 18; they are intended to be slipped into slots 18 from an exposed end, such as that facing the viewer.

The term "sprung" was used to describe the splaying of the legs 14 when they were forced into slots 18. It is recognized that copper is likely to have very little true elasticity after being subject to a brazing operation; the term is retained to emphasize the fact that the legs 14 are forced into contact with the inner faces of slots 18 so that there will be a fairly good thermal contact between them even before the alloy melts. Normal variations in alignment may be expected to produce a somewhat similar effect between legs 14' and slots 18 also.

It is evident that what has been disclosed includes male and female connections which could be interchanged. I prefer the arrangement shown for the practical reason that male members are more likely, because they do protrude, to be damaged than are female members; thus it is preferable to make the removable members the male members.

It has not been stated that the tinned surfaces are to be joined by heating them to the fusion temperature of the eutectic 24. So long as the thermal conductivity between backing 12 and support 20, and the cooling of support 20, are adequate to keep eutectic 24 on backing 12 below its fusion point, it is preferable that it not fuze, to facilitate any future disassembly. However, if for any reason (such as oxidation of some interface) the conductivity between backing 12 and support 20 becomes insufficient to keep eutectic 24 on backing 12 below its fusion temperature, it will melt, touch and melt the eutectic 24 on support 20, and increase the thermal conductivity and thereby reduce the temperature of the adjacent part of backing 12. This may well cause the eutectic 24 to freeze again; in any event it will be frozen when the apparatus is cooled down for removal of the ceramic 10; then the apparatus must be heated to the melting point of the lead-tin alloy; but this is only about 170° C. and entails no great inconvenience, considering that it is incurred to ameliorate an unfavorable circumstance which could otherwise produce much worse effects.

The maximum permissible temperature of the channel 16 and the lower face of backing 12 is that at which the heat flux through ceramic 10 and backing 12 will suffice to keep the exposed face of ceramic 10 from reaching an injuriously high temperature. This is necessarily a function of the heat flux incident upon ceramic 10; typically for MHD devices this runs of the order of 50 to 500 watts per square centimeter. A symbolic radiation source 30 is shown in FIGS. 1 and 3. This maximum permissible temperature is thus not comparable with the melting point of the backing 12, but is a function of the cooling path resistance and the flux it must carry away; but this maximum permissible temperature is the upper bound for the melting point of the tinning material, whose other requirements are that it wet the surfaces to be tinned, and that it be stable under its rather easy conditions of use.

Theoretically, it would not be necessary to tin support 20 and its slots 18; but as a practical matter tinning provides a surface which will be surely wet by the molten alloy from channel 16 and backing 12. Alternative ways of providing such a surface would be operative, but probably less desirable.

What is claimed is:

1. A male element for mating with a female element to make a thermally conductive connection between
   a. a cooling element for receiving heat flux from
   b. the cooled end of a structure having an opposed hot end which receives heat flux from a source at a temperature greater than the permissible operating temperature of the cooled end:

comprising:
   c. a male metal face adapted to mate with a female metal face on a female element;
   d. two metal legs extending from the said male metal face, adapted to enter two slots in the said female metal face;
   e. a coating on the said male metal face and the said metal legs of a fusible metal having a melting point less than the maximum permissible operating temperature of the said cooled end, and adapted, when molten, to wet the said male metal face and the said metal legs and the said female metal face.

2. The male element claim in claim 1 in which the said two metal legs are parallel to each other.

3. The male element claimed in claim 1 in which the said fusible metal is a lead-tin alloy.

4. A female element for mating with a male element to make a thermally conductive connection between
   a. a cooling element for receiving heat flux from
   b. the cooled end of a structure having an opposed hot end which receives heat flux from a source at a temperature greater than the permissible operating temperature of the cooled end;

comprising:
- c. a female metal face on the female element adapted to mate with a male metal face on a male element;
- d. the female metal face having two slots adapted to mate with two metal legs on the said male element,
- e. the said slots extending non parallel to each other into the female element
- f. a coating on the said female metal face and on the interiors of the said slots of a fusible metal having a melting point less than the maximum permissible operating temperature of the said cooled end and adapted, when molten, to wet the said female metal face and the said slots and the said male metal face.

* * * * *